Dec. 8, 1942.  W. L. HANSEN ET AL  2,304,688

ROTOR FOR SYNCHRONOUS MOTORS

Filed Aug. 28, 1940

INVENTORS
WILLIAM L. HANSEN
IRA N. HURST

BY Toulmin & Toulmin
ATTORNEYS

Patented Dec. 8, 1942

2,304,688

UNITED STATES PATENT OFFICE 2,304,688

ROTOR FOR SYNCHRONOUS MOTORS

William L. Hansen and Ira N. Hurst, Princeton, Ind., assignors to Hansen Mfg. Company, Inc., Princeton, Ind., a corporation of Indiana Application August 28, 1940, Serial No. 354,590

5 Claims. (Cl. 172—278)

This invention relates to electrical synchronous motors, such as are employed for operating clocks and in particular the invention concerns the rotor element of such a motor.

The primary object of the present invention is to provide an improved rotor suitable for a slow speed electrical synchronous motor, and in which the rotor produces high starting and high operating torques. This object is attained in brief by providing a rotor having a scalloped edge at the position where the magnetic flux of the motor is maximum, the scalloped edge serving to divide the rotor rim into a number of relatively independent magnets in order to produce strong synchronous speed qualities and yet permit slippage of the magnetic flux through the rim in order to produce a strong starting torque.

The invention will be better understood when reference is made to the following description and the accompanying drawing in which:

In Figure 1, the spider portion of the rotor has been broken away in order more clearly to see the magnetic structure of the motor.

Figure 1:
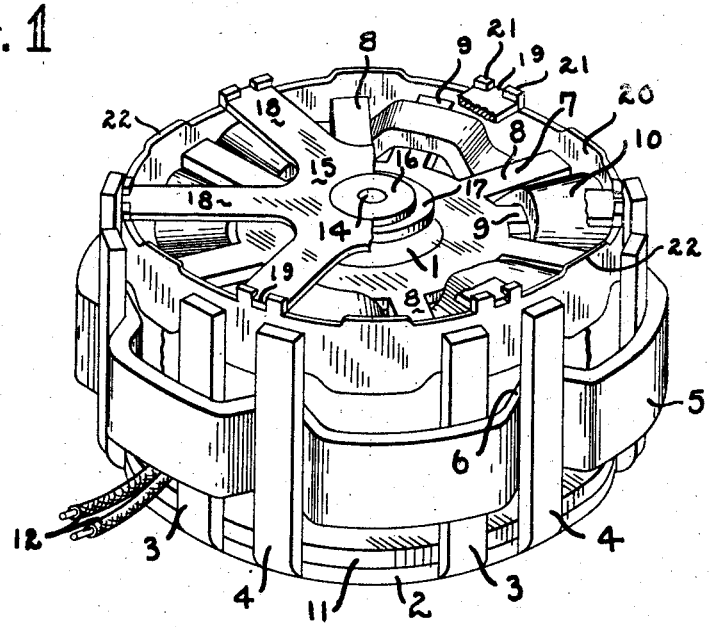
Figure 1 shows in perspective a motor of the annular air gap type, the improved rotor being received within the air gap.

Referring to the drawing in detail numeral 1 designates the upper flange of a magnetic tubular hub (not shown) on which are mounted the outer and inner field pole assemblies. The outer field pole structure consists of a disc 2 having an aperture (not shown) by which it is mounted on the tubular hub at the bottom and having axially directed pole pieces 3, 4 disposed alternately in a cylindrical path around the hub. The pole pieces 3, 4 are preferably not equidistantly spaced about the disc 2 but instead are arranged in pairs around the periphery of the disc.

The alternate pole pieces 4 are shaded by an undulating ring 5 of nonmagnetic material, such as copper. The undulating ring 5 passes over the outer surface of the pole pieces 3 and therefore does not shade them. The shading ring 5, however, is provided with undulating portions 6 passing around three sides of each pole piece 4 thereby shading these pole pieces and providing a phase lag when the field structure is magnetized by an alternating flux.

The inner field pole assembly consists of a disc portion 7, having an aperture by which it is mounted on the tubular hub at the opposite end thereof from the disc 2. The disc 7 is provided with pole pieces 8, 9 which extend practically radially from the disc and are arranged in pairs around the periphery of the disc. The pole pieces 8, 9 do not extend as far as the pole pieces 3, 4 but instead are cut short so as to leave an annular space between the tips of the pole pieces 8, 9 and the inner peripheral surface of the pole pieces 3, 4. The width of this annular space is such as to accommodate the thickness of a rotor.

It will be noted from the drawing that the radial pole pieces 8, 9 are not in line with the axial pole pieces 3, 4 but that the pole piece 8 is positioned at an angle measured in the clockwise direction with respect to the pole piece 3, and the pole piece 9 is positioned at a similar angle but measured in the counter-clockwise direction with respect to the pole piece 4. In other words, the axial pole pieces 3, 4 are positioned intermediate the radial pole pieces 8, 9. The angle by which the pole pieces 8, 9 either follow or precede the adjacent pole pieces 3, 4 constitutes a so-called "lead" angle which serves to assist in the creation of a rotating field and determines the direction in which the field rotates. It will be understood that the relative positions of the pole pieces 8, 9 with respect to the axial pole pieces 3, 4 are subject to experiment and adjustment depending on the compromise desired between the starting and operating torques, and also on the use to which the motor is put.

The pole pieces 9 which alternate with the pole pieces 8 are shaded by an undulating ring 10 of a nonmagnetic metal such as copper, this shading ring having undulating portions passing around three sides of each of the pole pieces 9, so as to shade these pole pieces. However, the shading ring merely passes across the rear face of each pole piece 8 and therefore does not shade it. As can be seen on the drawing this shading ring has considerable width measured in the radial direction, so that the pole pieces 8, 9 are likewise provided with considerable length in order to accommodate the shading ring.

The field structure formed by the radial pole pieces 8, 9 and the axial pole pieces 3, 4 is magnetized by a field coil (not shown) wound on a drum (not shown) of insulating material which surrounds the tubular hub and contained between a pair of webs 11 of insulating material and of which only the lower web has been illustrated. There are a pair of leads 12 connected to opposite ends of the coil and adapted to be connected to a suitable source of alternating current.

Figure 2:
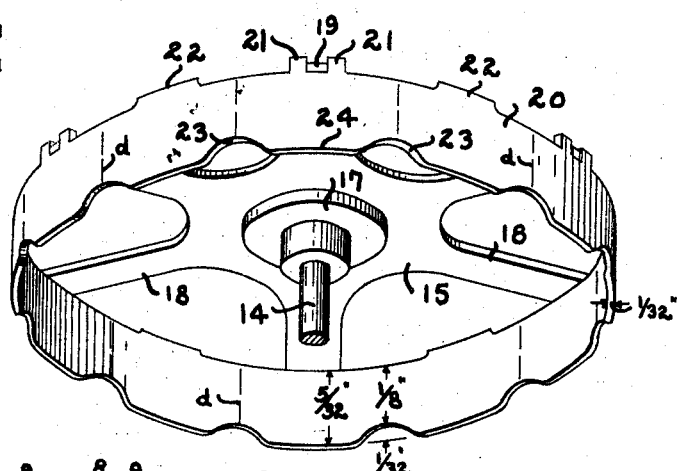
Figure 2 is a perspective view of the improved rotor looking upwardly toward the underneath side.

The magnetic hub is provided with an axial bore closed at each end by plug washers which carry a thrust washer (not shown). These washers have an opening at the center which receives a shaft 14 of a rotating spider 15 made of a light metal such as aluminum. The spider may be secured to the shaft 14 in any suitable manner and, as illustrated, the spider is clamped between two spaced collars 16, 17 which are affixed to the shaft. As seen in Figure 2, the spider 15 has six legs indicated at 18 and these legs terminate at the outer extremities in tongues 19, as seen in Figure 1. The rotor proper is constituted of a hardened steel rim 20 which is provided at its upper edge with spaced pairs of projections 21 having a groove therebetween which snugly receive the tongues 19 of the spider 15. The upper edge (Figure 2) of the rotor may be optionally provided with upstanding projections 22 of relatively small height and equidistantly spaced between the pairs of projections 21.

The rotor 20 which forms the subject of the present invention is preferably radially thin and axially wide, light in weight, of the continuous type and having a smooth finish. The width of the rotor band 20, as measured in the axial direction, is such as to extend somewhat beyond the entire distance between the upper and lower edges of the radially extending pole pieces 8, 9. In other words, the width of the band should be greater than the thickness of the pole pieces 8, 9 and extending above the upper and lower surfaces of these pole pieces. This is shown in Figure 1 which also illustrates that the axial pole pieces 3, 4 extend somewhat beyond the upper surfaces of the radial pole pieces 8, 9.

As shown more clearly in Figure 2, the lower edge of the rotor rim, i. e., the edge which is positioned remote from the spider 15 and projects for the greater distance into the annular space between the radial and axial pole pieces, is provided with scallops or undulations. Thus the rotor rim is constituted of alternate wide and narrow portions and it is preferred that there shall be as many wide portions as there are poles of the motor. It will be noted that the scallops at the lower edge are so arranged that every other scallop is positioned directly below the grooved projections 21, the intermediate scallop being positioned directly below the small upstanding projections 22.

While various forms of scallops may be provided at the lower edge of the rotor, we prefer the configuration shown in Figure 2 in which the lower edge is provided with outwardly extending cutout portions indicated at 23 of a circular character, these circular cut-outs being joined by a scalloped portion 24 having a relatively flat lower edge. All the corners are rounded off. The depth of the circular cut-outs 23 is best determined by experiment and depends upon many factors such as the power of the motor, the thickness of the rotor and the use for which the motor is employed. However, in the case of a clock motor which has a fairly low current consumption and a relatively low speed, we have found that desirable results by way of large starting torques and considerable ability to lock in step at synchronous speed are obtained when the depth of the circular portion is not more than one-quarter of the complete width of the rotor. Thus in the case of an ordinary clock motor having six pairs of poles as illustrated and utilizing a rotor of 1½" in diameter, the rotor may have a thickness, as measured radially, of approximately $\frac{3}{32}$", and its greatest width, as measured across each scalloped portion in the axial direction (but neglecting the height of the projections 21) of $\frac{3}{32}$", and the width of the rotor as measured at the point where the cut-outs 23 occur, should be approximately ⅛". In other words, in a rotor of the size indicated the depth of the curved portion 23 should be not more than $\frac{3}{32}$" when the total width of the rotor is approximately $\frac{3}{32}$". This has been indicated in Figure 2 in which the dimension at the widest point of the rotor is given as $\frac{3}{32}$", the depth at each notch as ⅛" and the depth of the notch as $\frac{3}{32}$". These dimensions are purely exemplary.

The mode of operation

When the leads 12 are connected to a source of alternating single phase current, preferably 110 volts, and assuming that the rim portion of the rotor projects downwardly into the annular space between the ends of the radial pole pieces 8, 9 and the inner surfaces of the axial pole pieces 3, 4 the rotor will be caused to rotate at a speed determined by the frequency of the alternating current source and the number of pairs of poles of the motor. In the case of a six pole motor, as illustrated, the rotor will turn at 600 R. P. M. thus being termed a "slow speed" motor. It has been explained that the shading rings 5 and 10 cause a magnetic field to rotate about the successive pairs of pole pieces, the direction of the field rotation being determined by the angle by which the radial pole pieces either precede or follow the axial pole pieces. The effect of the shading rings is to diminish the magnetic flux in the pole pieces which are shaded by these rings, but to leave the flux in the unshaded pole pieces at its original value.

Figure 3:
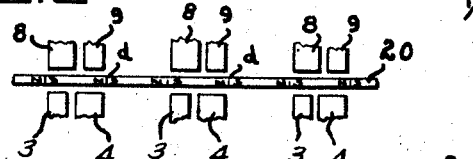
Figure 3 is a diagrammatic view useful in explaining the principles of the invention.

At the instant connection is made between the leads 12 and the source of alternating current, and assuming for the moment that the rotor has not started to turn, the effect of the flux passing between the pole pieces 4 and 9, also between the pole pieces 3 and 8, is to permanently magnetize that portion of the rotor rim positioned between the pole pieces and contained between two adjacent cutaway portions 23. In other words, the rim of the rotor comprises a number of permanent magnets, the north pole of one magnet becomes adjacent the south pole of the next magnet at the imaginary line $d$, as indicated in Figures 2 and 3, and this line coincides with the center of the cutaway portion. However, due to the fact that the magnetic flux which is generated by the oppositely disposed pole pieces is not of a uniform character on account of the diminution of this flux introduced at the shaded poles, the flux in the rim is not of a constant value but becomes graded in such a way as to cause the rim to move with respect to the pole pieces. As soon as the rotor starts to move the magnetic flux within the rim is caused to slip or shift from the position that this flux had at the time the rotor was at rest so that instead of having north and south poles on opposite sides of the imaginary line $d$, the flux flows first in one direction and then in the opposite direction across this line at a rate depending on the instantaneous speed of the rotor. Consequently, at the moment that the rotor starts to turn there is flowing across the imaginary line $d$, not only the flux due to the permanent magnetization of the individual magnets formed when the rotor was at rest, but also the flux brought about by the periodic change in the polarities of the radial and axial pole pieces.

We have found in accordance with this invention that in order to provide for the slipping and shifting of the flux, as explained above, it is necessary that the rotor shall have a cross-sectional area at the line $d$ sufficiently large to prevent saturation or other reluctance effects to the changing flux. In the case of a motor employed in clocks and consuming a few watts during operation, and running at 600 R. P. M. we have found that if the cutaway portion 23 has a depth of not more than one-quarter the dimension of the width of the rotor, the latter will have a sufficient cross-sectional area at the cutaway portion to accommodate the flow of flux and thus eliminate any flux distortion within the rotor.

It will be understood that the undulations 23 are desirable and necessary in that when the rotor reaches synchronous speed, each half of the alternating voltage cycle applied at the leads 12 serves to set up in the rim a permanent magnet effect, the same as when the rotor is at rest, the magnetic poles being separated at the imaginary line $d$, and this effect tends to hold the rotor strictly in step with the alterations of the rotating field. On the other hand, the use of the undulations 23 may offer a disadvantage from the starting standpoint in that a similar permanent magnetic effect is introduced while the rotor is at rest, as explained above, and this permanent magnetism must be taken into account if the rotor is to develop considerable starting torque.

Accordingly, by providing the notches or undulations 23, in order to cause the rotor to lock into step with a synchronous alternating field and by leaving sufficient metal directly above these notches or undulations as to prevent saturation or other distorting effect on the flux flowing across the line $d$ when the rotor moves from rest, we have provided a rotor which has not only superior operating characteristics, but also superior starting characteristics. The criterion as to whether a given rotor will be self-starting and will hold a strictly synchronous speed depends on the amount of metal that is provided directly over each notch or undulation. As stated hereinbefore if the depth of the rotor at this point is not less than three-fourths the depth of the rim at the scalloped portion no crowding of the flux will be caused at the imaginary line $d$ at the moment the rotor starts to turn. These relative dimensions have been illustrated in Figure 2, purely by way of example and these dimensions give optimum results by way of a self-starting rotor of relatively small size. These desirable results are obtainable in a degree depending on the amount of conformance had between the dimensions of a given rotor and these relative dimensions. As for the lower limit of dimension that the rotor rim can have directly above each notch and still obtain the self-starting characteristic with appreciable starting torque, the notch or undulation should not extend beyond the midpoint of the width of the rim unless the thickness of the rim has been appreciably increased. In general, the greater the width of the rim at each notched portion the more easily will the motor start and the higher will be the starting torque, but the less will be the tendency for the rotor to lock into step at the synchronous speed.

It will be understood that we desire to comprehend within our invention such modifications that come within the scope of the claims and the invention.

Having thus fully described our invention, what we claim as new and desire to secure by Letters Patent is:

1. In a synchronous motor, a magnetic core, a magnetic field member mounted on one end of said core and having outer pole pieces disposed axially in a substantially cylindrical path, a shading member encircling the cylindrical path of said outer pole pieces, a second magnetic field member mounted on the other end of said core and having inner pole pieces disposed radially with their tips spaced from the tips of the axial pole pieces to leave an annular opening between the pole tips, a shading ring passing over and under the successive inner pole pieces, a rotor designed to give high starting and operating torques and extending from the exterior of said motor into the annular opening, the edge of the rotor which is positioned within the interior of said motor being provided with undulations the number of which is the same as the number of cooperating pole piece pairs.

2. In a synchronous motor, a magnetic core, a magnetic field member mounted on one side of said core and having outer pole pieces disposed axially in a substantially cylindrical path, a second magnetic field member mounted on the other end of said core and having inner pole pieces disposed radially with their tips spaced from the tips of the axial pole pieces to leave an annular opening between the pole tips, a rotor designed to give high starting and operating torques and positioned within said annular opening, and a shading member encircling said cylindrical path of said outer pole pieces and arranged to shade alternate outer pole pieces, said rotor being provided with straight and notched portions, the number of straight portions being the same as the number of cooperating pairs of pole pieces, the depth of the notches being not greater than one-quarter the depth of the rotor as measured at the straight portions.

3. In a synchronous motor, a magnetic core, a magnetic field member mounted on one end of said core and having outer pole pieces disposed axially in a substantially cylindrical path, a second magnetic field member mounted on the other end of said core and having inner pole pieces disposed radially with their tips spaced from the tips of the axial pole pieces to leave an annular opening between the pole tips, a rotor designed to give high starting and operating torques and positioned within said annular opening, and a shading member encircling said cylindrical path of said outer pole pieces and arranged to shade alternate outer pole pieces, and a second shading member positioned adjacent said inner pole pieces and arranged to shade alternate inner pole pieces, said rotor having notches formed along the edge thereof, the number of which is the same as the number of cooperating pole piece pairs, said notches being of circular configuration and having a depth such as to leave a cross-sectional area of metal directly above each notch not less than three-fourths the metal cross-sectional area at the remaining portions of the rotor.

4. In a synchronous motor, a magnetic core, a magnetic field member mounted on one side of said core and having outer pole pieces disposed axially in a substantially cylindrical path, a shading member encircling the cylindrical path of said outer pole pieces, a second magnetic field member mounted on the other end of said core and having inner pole pieces disposed radially with their tips spaced from the tips of the axial pole pieces to leave an annular opening between the pole tips, a shading ring passing over and under the successive inner pole pieces, and a rotor designed to give high starting and operating torques and positioned within said annular opening, said rotor being constituted of magnetic material and its periphery being divided into a plurality of magnetic regions which cooperate with the pole pieces to cause a rotary effort, the number of said magnetic regions being the same as the number of the cooperating pairs of pole pieces.

5. In a synchronous motor, a magnetic core, a magnetic field member mounted on one side of said core and having outer pole pieces disposed axially in a substantially cylindrical path, a second magnetic field member mounted on the other end of said core and having inner pole pieces disposed radially with their tips spaced from the tips of the axial pole pieces to leave an annular opening between the pole tips, a rotor designed to give high starting and operating torques and positioned within said annular opening, and a shading member encircling said cylindrical path of said outer pole pieces and arranged to shade alternate outer pole pieces, said rotor being provided with straight and notched portions along its edge, said rotor containing magnetized regions about its periphery, the south pole of each region merging with the north pole of the adjacent magnetic region at positions in line with the notches in the edge of the rotor, the number of said magnetic regions being the same as the number of the cooperating pairs of pole pieces.

WILLIAM L. HANSEN.
IRA N. HURST.